United States Patent [19]

Wayman

[11] 4,246,754
[45] Jan. 27, 1981

[54] SOLID STATE THERMAL ENGINE

[75] Inventor: Clarence M. Wayman, Urbana, Ill.

[73] Assignee: University of Illinois Foundation, Urbana, Ill.

[21] Appl. No.: 19,866

[22] Filed: Mar. 12, 1979

[51] Int. Cl.³ .............................................. F03G 7/06
[52] U.S. Cl. .................................................... 60/527
[58] Field of Search ......................... 60/527, 528, 529

[56] References Cited

U.S. PATENT DOCUMENTS

| 2,329,131 | 9/1943 | Ottmar | 60/529 |
| 4,075,846 | 2/1978 | Li | 60/527 |
| 4,150,544 | 4/1979 | Pachter | 60/527 |

Primary Examiner—Allen M. Ostrager
Attorney, Agent, or Firm—Mathew L. Kalinowski

[57] ABSTRACT

An improved solid state thermal engine utilizes as a drive member a braided belt fabricated from a memory alloy such as nickel-titanium and nickel-titanium ternary alloys, copper-zinc and copper-zinc ternary alloys, and the like. The braided belt is mounted on a set of pulleys to provide passage through a hot zone where the belt contracts and develops tension, and through a cold zone where it relaxes and stretches. Since more energy is delivered by contraction than is required for relaxation, positive work output results with an efficiency of between one-fifth and one-third of the Carnot cycle.

9 Claims, 5 Drawing Figures

FIG. 1
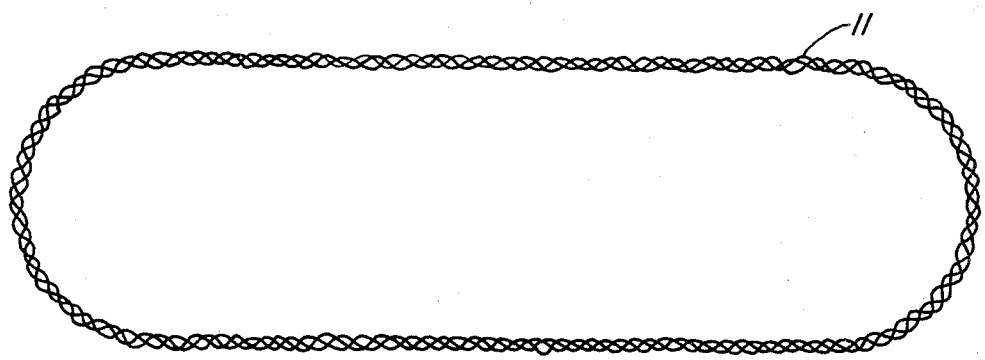
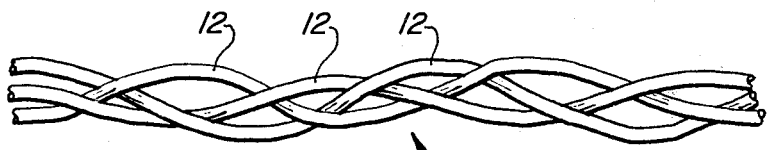
FIG. 1A
FIG. 2
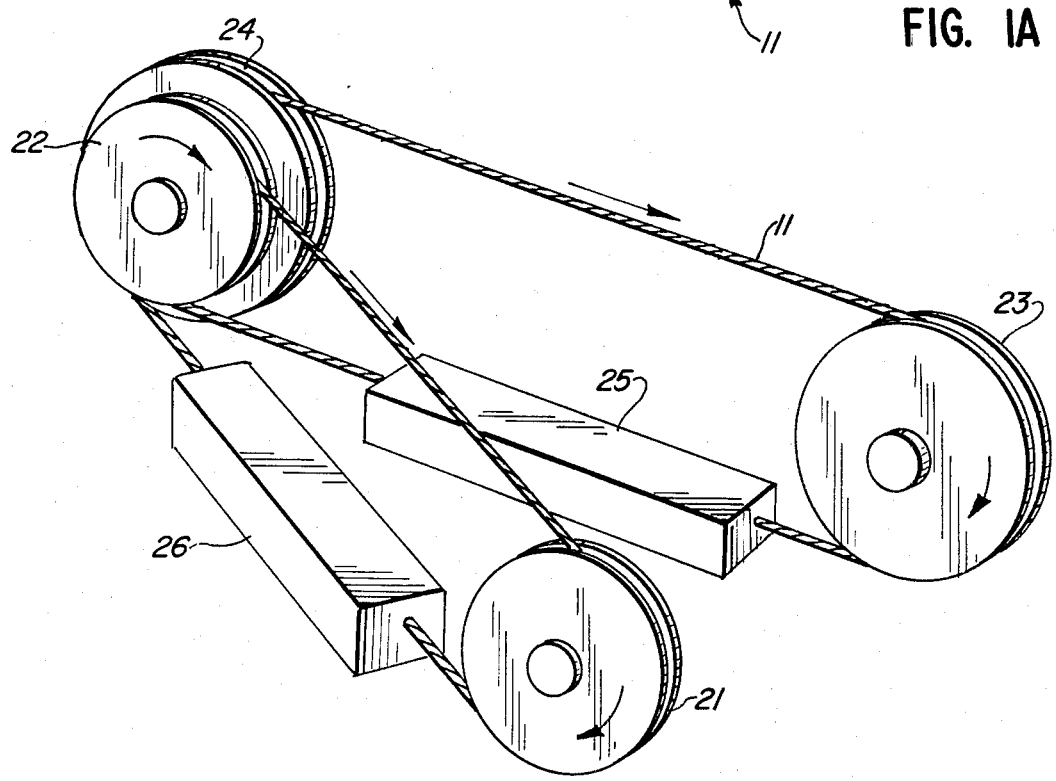

SOLID STATE THERMAL ENGINE

This invention relates to a solid state thermal engine that utilizes memory alloys as drive members. In a particular aspect, this invention relates to a thermal engine that utilizes a braided belt fabricated from a memory alloy such as nickel-titanium, nickel-titanium ternary alloys, copper-zinc, copper-zinc-aluminum, copper-aluminum-nickel, and like alloys.

The shape memory effect has been noted for many alloys, particularly for Nitinol, an approximately equiatomic alloy of nickel and titanium. The effect arises because a specimen apparently plastically deformed at some lower temperature reverts to its original shape on heating to a somewhat higher temperature. The effect has been noted for alloy systems other than nickel-titanium, for example, gold-cadmium, indium-thallium, copper-aluminum-nickel, copper-zinc-aluminum, iron-platinum, and nickel-aluminum. for all these materials, a common property is that each exhibits a martensitic transformation, and accordingly the shape memory effect has been related to the martensitic phase change. Since experimental evidence indicates that it is the martensitic phase which exhibits a memory, the term marmem is used herein as descriptive of alloys showing such behavior.

The thermodynamic considerations relating to solid state engines utilizing marmem alloys are outlined by Tong, H.C. and Wayman, C.M., Metallurgical Transactions A, Vol. 6A, 29-32 (1975). This study indicates that such engines can convert heat, for example solar energy and waste heat, into mechanical work with an efficiency of about one-fifth to one-third of the Carnot cycle.

A specific application relating to the conversion of heat to mechanical energy, utilizing the marmem alloy Nitinol, is disclosed in Buehler, et al., U.S. Pat. No. 3,403,238 which patent is incorporated herein by reference as illustrative of the state of the art.

Prior art thermal engines based on marmem alloys employ a variety of drive members, for example, wires, flat belts, helices, and the like. Energy output of such drive members, however, is limited by relatively low mass of alloy in the drive elements.

Accordingly, it is an object of this invention to provide drive members of high mass capable of higher energy output without sacrificing flexibility and fatigue characteristics.

It is a further object of this invention to provide a drive member in which the marmem alloy is pre-stressed or "trained" prior to permanent installation in an engine. These and other objects will become apparent as the description of the invention proceeds.

In accordance with this invention a marmem alloy is used to convert heat into mechanical energy by means of a solid state engine comprising an endless braided belt fabricated from the marmem alloy; means for guiding the belt in a closed path; successive cooling and heating zones in the closed path; means for applying tension to the belt; and means for utilizing the work output of the engine in relation to the motion of the belt. Suitably, the belt is mounted on a set of pulleys, tension is applied to the belt, and passage of the belt successively through the hot and cold zones results in a positive work output by virtue of the shape memory effect. The braided belt fabricated from three or more fine strands of marmem alloy provides high mass together with a high surface to volume ratio which provides utilization of heat energy with high efficiency and excellent heat exchange characteristics. In addition, the excellent flexibility characteristics of the braided belt minimize frictional losses and minimize metal fatigue.

It has been found that a newly fabricated belt acquires a permanent elongation of up to about 7% in the initial stages of its use. This requires a compensating adjustment of the pulleys, or other guide means, of the engine. Accordingly, it is advantageous to pre-stress the belt by operation in an engine configuration having a closed path that can be adjusted continuously until elongation of the belt reaches a stable value. The pre-stressed belt is then suitable for use in a thermal engine with a fixed pulley, or other guide means, configuration.

BRIEF DESCRIPTION OF THE DRAWINGS

FIG. 1 illustrates the braided belt of this invention fabricated from fine strands of marmem alloy.

FIG. 1A illustrates a section of the belt in enlargement.

FIG. 2 illustrates an embodiment of the present invention in a thermal engine.

Figure 3:
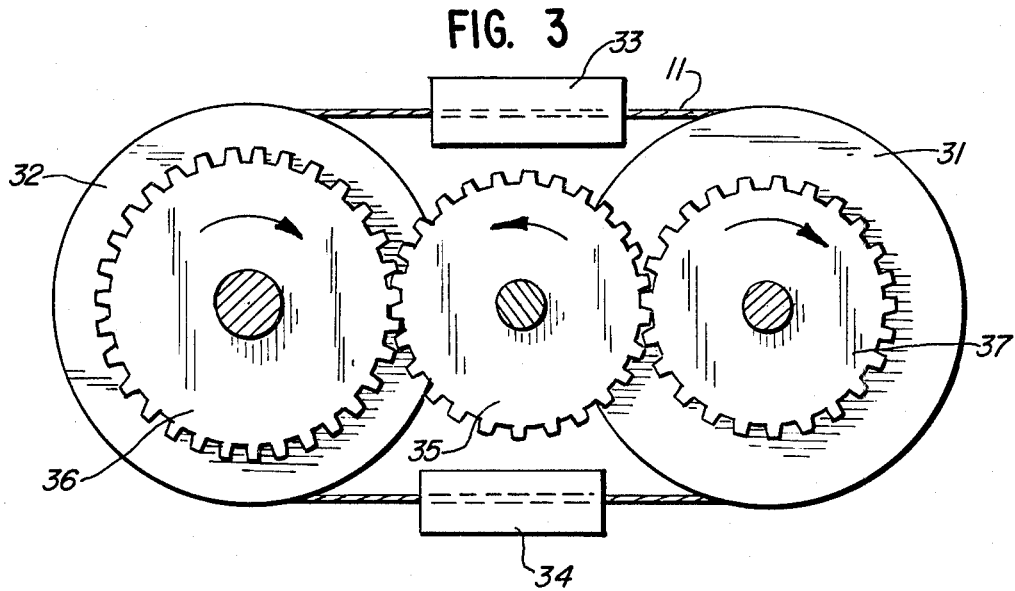
FIG. 3 illustrates another embodiment of the invention in a thermal engine.

In a specific embodiment of this invention, belt 11 was fabricated from three strands 12 of Nitinol alloy. Each strand had a diameter of 0.7 mm; the belt was formed into an 81 inch loop. The belt was mounted on the engine shown in FIG. 2. Pulleys 21, 22, and 23 each had a diameter of 9.8 cm and pulley 24 a diameter of 10.2 cm. A tension of about 25,000 psi was applied to the belt by means of a spring load applied to pulley system 22-24. Hot zone 26 contained water at a temperature of 70° C. Cold zone 25 contained water at a temperature of 15° C. The temperature differential and the tension imposed upon the braided belt resulted in motion of the belt in the closed path defined by the pulley arrangement. A speed in excess of 100 rpm(no load) was readily realized which energy output can be taken from one or more of the axles supporting the pulleys.

In the initial operation of the engine, elongation of the belt from 81 inches to 87 inches occurred, which necessitated a re-spacing of the pulleys. This can be avoided by fabricating the belt to 90-95% of the desired length and pre-stressing and running the belt to the final desired length. Such pre-stressing can be effected by mounting the belt in an engine having an adjustable set of pulleys. The engine is operated under the conditions described above, for example with continuous adjustment of the pulleys as the belt elongates. Tension on the belt is maintained at a value at least equal to that which will be employed in the final engine installation. After a short run-in period, no further stretching occurs. The pre-stressed belt is now ready for use in an engine with a fixed pulley arrangement.

Another embodiment of the thermal engine of this invention is shown in FIG. 3. Belt 11 passes over pulleys 31 and 32, and through hot zone 33 and cold zone 34. Idler gear 35 engages both gear 36, axially mounted and fastened to pulley 32, and smaller gear 37, axially mounted and fastened to pulley 31. The difference in size between gears 36 and 37 is chosen to provide a difference in rotational speed of pulleys 31 and 32 such that a tension of up to about 30,000 psi is developed on belt 11.

Belt 11 is preferably pre-stressed as described above. Three or more fine strands of marmem alloy are employed in the fabrication of the belt. Suitable marmem alloys have compositions that exhibit martensitic transformation temperatures over the range of about −150° to 200° C., which defines the operating temperature range for engines using such alloys.

Hot zone 33 provides the heat energy required to drive the engine which can be obtained from a variety of sources such as solar heat, geothermal heat, and industrial waste and by-product heat. Heat produced in household appliances, for example hot air furnaces, refrigerator defrosters, ovens, and laundry driers can be advantageously converted to mechanical energy to drive fans associated with such devices.

Cold zone 34 can be water, air, or any means that provides a temperature below that of the hot zone and heat removal sufficient to relax and stretch the marmem belt.

Figure 4:
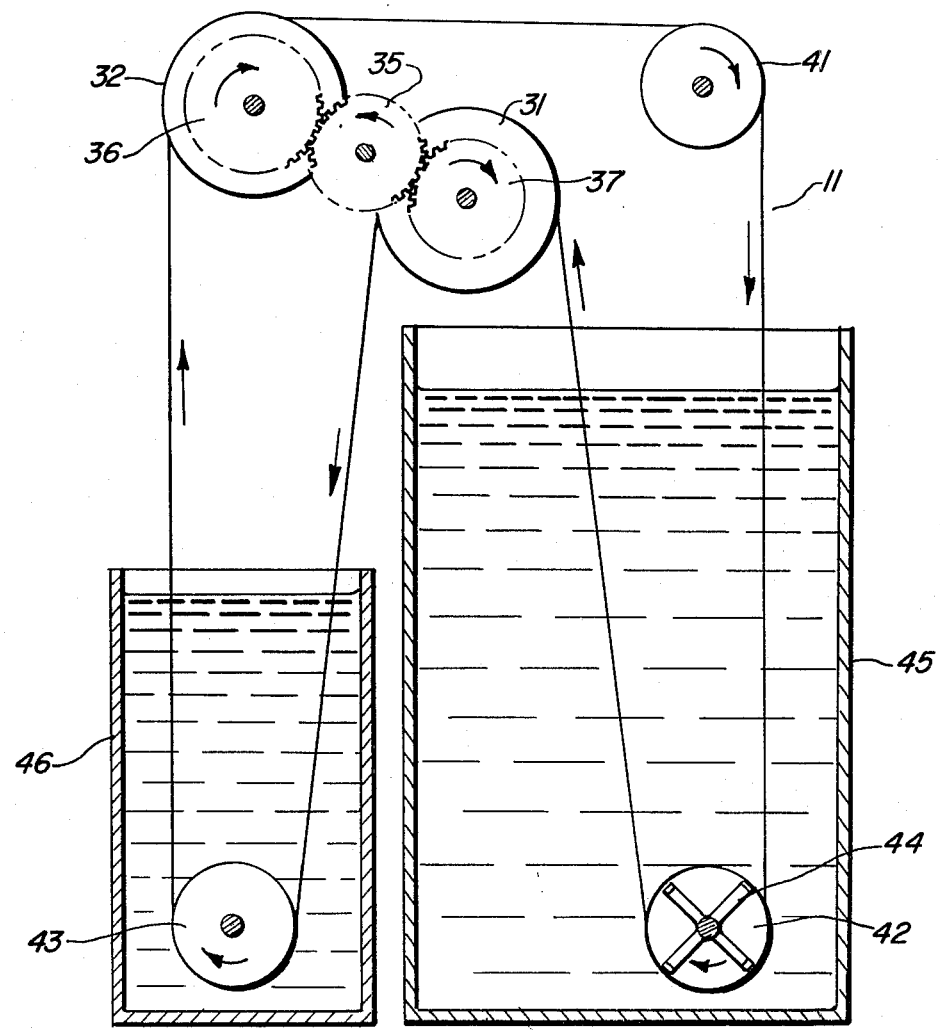
FIG. 4 illustrates an application of the inventive engine in which heat developed in a chemical reaction is removed and used to drive an agitator within the reaction vessel.

FIG. 4 illustrates application of the engine of FIG. 3 to remove heat developed in a chemical reaction and to drive an agitator in the reaction vessel. Belt 11 is mounted on the engine of FIG. 3 and is made sufficiently long to pass over pulleys 41, 42, and 43. A set of agitator blades 44 is mounted coaxially on pulley 42. Tank 45 contains a reaction system which develops a positive heat of reaction, for example a fermentation process. Tank 46 contains an inert cooling fluid. A temperature differential is established between tank 45 and tank 46 sufficient to drive the engine and agitator, thereby providing precise control of the temperature of the reactants in tank 45 by removal of heat and by agitation of the reactants.

Although this invention has been described with particular reference to certain preferred embodiments thereof, it is understood that variations and modifications can be effected within the scope of the apended claims.

What is claimed is:

1. A solid state thermal engine comprising:

(a) an endless braided belt fabricated from a marmem alloy;
   (b) means for guiding the belt along a closed path;
   (c) cooling means and heating means in said closed path;
   (d) means for applying tension to the belt; and
   (e) means for utilizing the energy output of the engine in relation to the motion of the belt.

2. the engine of claim 1 wherein the braided belt contains at least three strands of marmem alloy, the marmem alloy being selected from the group consisting of nickel-titanium, nickel-titanium ternary alloys, copper-zinc, and copper-zinc ternary alloys.

3. The engine of claim 1 wherein the cooling means is a body of cold fluid and the heating means is a body of hot fluid.

4. The engine of claim 1 wherein the braided belt is fabricated from at least three strands of Nitinol alloy, the cooling means is a body of cold water, the heating means is a body of warm water, and the tension ranges up to about 30,000 psi.

5. A pre-stressed braided belt drive member for a solid state thermal engine comprising a plurality of strands of marmem alloy, the pre-stressing being an elongation of up to 7% of the length of the belt.

6. The pre-stressed belt of claim 5 wherein the pre-stressing is effected by passing the belt in a closed path successively through cooling means and heating means, and under sufficient tension to provide the elongation.

7. The pre-stressed belt of claim 5 wherein the belt contains at least three strands of marmem alloy, the marmem alloy being selected from the group consisting of nickel-titanium, nickel-titanium ternary alloys, copper-zinc, and copper-zinc ternary alloys.

8. The pre-stressed belt of claim 6 wherein the cooling means is a body of cold fluid and the heating means is a body of hot fluid.

9. The pre-stressed belt of claim 6 wherein the braided belt is fabricated from at least three strands of Nitinol alloy, the cooling means is a body of cold water, the heating means is a body of warm water, and the tension is sufficient to provide an elongation of about 4–7% of the length of the belt.

* * * * *